Patented May 5, 1953

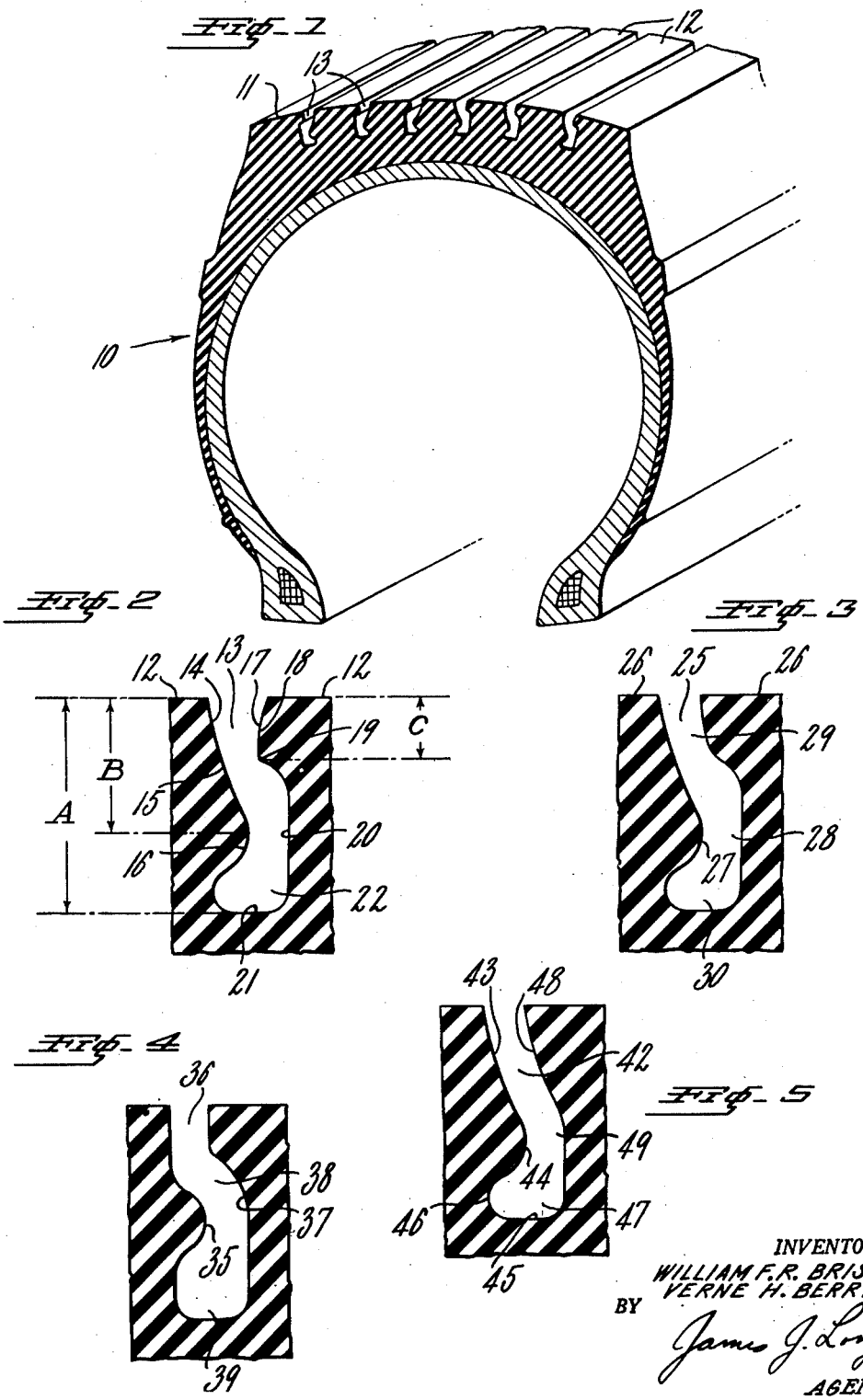

2,637,362

UNITED STATES PATENT OFFICE 2,637,362

STONE-EJECTING TIRE TREAD

William F. R. Briscoe and Verne H. Berry, Detroit, Mich., assignors to United States Rubber Company, New York, N. Y., a corporation of New Jersey Application July 14, 1950, Serial No. 173,885

7 Claims. (Cl. 152—209)

This invention relates to pneumatic tires, and more particularly it relates to tire treads having improved means for preventing stones or pebbles and the like from becoming picked up from the road and retained in the anti-skid grooves of the tread.

Pneumatic tires are conventionally provided with a tread surface having an anti-skid pattern defined by grooves which are molded in the surface of the tread during manufacture. A highly preferred anti-skid pattern comprises a plurality of continuous circumferentially extending grooves dividing the tread surface into a series of parallel relatively narrow circumferential ribs. It is observed that such tread grooves have a tendency to pick up small stones from the road, which become lodged in the grooves, causing frictional and abnormal flexing in the bases of the grooves, with the result that cracks or other injuries develop, and such injuries frequently lead to premature failure of the tire. Also, the retained stones give rise to objectionable tire noise.

In U. S. Patent 2,121,871 issued to Glenn G. Havens, there is disclosed a means for preventing stone retention in tire tread grooves, in the form of a projecting rib located in the side wall of the groove. This construction has been found in practice to produce marked reduction in the number of stones retained in a grooved tread; in fact, such construction has approximately 5 or 6 times as much resistance to stone pick-up as grooves with straight sidewalls of the same depth and width.

However, there has been a desire for even greater improvement in prevention of stone retention. The need for such improvement is especially felt in connection with exceptionally narrow grooves and ribs, such as are featured on certain present day low pressure tires of the premium grade. Particular difficulty is experienced with such tires in accomplishing the stone ejecting function both when the tire is new and as the tire tread wears away and the grooves become relatively shallow.

Accordingly, it is an object of the invention to provide a tire tread groove structure that has greater resistance to stone pick-up and retention.

Another object is to provide a stone ejecting groove structure which is effective both when the tire is new, and after considerable tread wear has taken place.

These and other objects and advantages of the invention will be made evident in the following detailed description when read with reference to the accompanying drawing wherein:

Fig. 1 is a perspective view, in section, of a portion of a pneumatic tire casing constructed according to the invention;

Fig. 2 is an enlarged transverse sectional view of a portion of the tire tread shown in Fig. 1; and Figs. 3, 4 and 5 are similar views of modifications of the invention.

Referring to the drawing, and in particular to Figs. 1 and 2, there is shown a pneumatic tire casing 10 having a rubber tread portion 11 which is divided into a series of parallel circumferentially extending continuous ribs 12 by intervening tread grooves 13. One sidewall 14 of each groove 13 is flared or deflected gradually inwardly toward the center of the groove as shown at 15, starting at the tread surface and proceeding toward the bottom of the groove, and forms a generally curved laterally extending projection 16 extending along such side wall. The projection 16 extends continuously around the tire. The outermost point of the projection 16 is preferably spaced from the tread surface by a distance equal to approximately ⅔ of the total depth of the groove, that is, the distance designated B in Fig. 2 is preferably about ⅔ of the distance A. The precise location of the projection 16 may be varied, and it will in general be found that best results are obtainable when the distance B is within the range of from ½ to ¾ of the distance A.

The other sidewall 17 of the groove 13 is deflected inwardly toward the center of the groove, as at 18, starting at the tread surface and proceeding to a point 19 spaced from the surface of the tread by a distance equal to approximately ¼ of the total depth of the groove, that is, the distance C is ¼ of the distance A. The remaining portion of the sidewall 17 of the groove is provided with an undercut or laterally recessed area 20 located in generally opposite relation to the projection 16, so that the projection 16 is accommodated by the recess 20 when the walls of the groove are moved toward each other. Thus, the groove has, over the zone of its medial depth, a laterally deflected or curved path with respect to a line drawn normal to the tread surface. The recess 20 extends to the bottom 21 of the groove and extends continuously around the tire.

The projection 16 is spaced from the base 21 of the groove so that there is in the area of the base of the groove a relatively enlarged groove portion 22.

It has been found by actual tests that tires provided with grooves shaped in the foregoing manner display markedly superior resistance to stone pick-up, compared to previously known groove structures. For example, in order to test the efficiency of the grooves, 8.20-15 size tires having a tread width of approximately 4.8 inches divided into 7 continuous circumferentially extending ribs approximately 0.55 inch wide, defined by grooves .176 inch wide at the tread surface and .41 inch deep, and shaped in the manner described, were driven over a test road. These tires were observed to have approximately 25 times as much resistance to stone pick-up as tires with the previously best known stone ejecting grooves, having lateral projections in the groove sidewalls but without the other essential features of the present structure.

Fig. 3 shows a modified form of groove 25 defining narrow ribs 26 of a tire tread. This form of the invention has a projection 27 from one side of the groove and a recess 28 located opposite to the projection in the other side wall for accommodating the projection when the walls of the groove are constricted under load, and is characterized by the fact that the upper walls of the groove are essentially parallel, instead of having the groove opening flare to a larger size towards the tread surface as in Fig. 2. The groove 25 is seen to be laterally deflected over its upper portion 29 and enlarged at its base 30.

In the form of the invention shown in Fig. 4, the projection 35 in the sidewall of the tread groove 36 is spaced from the tread surface by a distance equal to about ½ of the total depth of the groove. The other surface is undercut at 37 opposite the projection 35, to receive the projection when the groove narrows under load. The upper walls of the groove, instead of being slanted, are essentially normal to the tread surface, and are parallel. The medial zone 38 of the groove is deflected or laterally offset, and the base area 39 of the groove is relatively enlarged.

The modification of the invention shown in Fig. 5 comprises a tire tread having a groove 42 in which the upper sidewall 43 on one side slopes gradually inwardly of the groove to form a projection 44 toward the bottom 45 of the groove and spaced therefrom. As in the previously described forms of the invention, the lower portion 46 of this sidewall returns outwardly below the projection 44 to form an enlarged base portion 47 in the bottom of the groove. The opposite wall of the groove 42 slopes outwardly from the groove center line over its upper portion 48 and is generally parallel to the other upper wall 43. The wall 48 thereby forms an undercut portion or recess 49 opposite the projection 44.

The effectiveness of the present groove structure in preventing retention of stones in the grooves is due in large part to the manner in which one sidewall of the grooves is recessed or undercut, as shown at 20 in Fig. 2, and at 28, 37 and 48 in Figs. 3, 4 and 5, respectively. Such undercutting is preferably located on the side of the groove toward the lateral edges of the tread, as shown in Fig. 1. When the tread is pressed into contact with the road, the sides of the grooves toward the edges of the tread are deflected inwardly toward the center line of the tire by reason of the undercut portion on the outer sidewall of the groove, which weakens this sidewall and makes it susceptible to inward deformation. As a result of this action the width of the groove at the surface of the tread is very much constricted when the tread is in contact with the road, so that only the smallest stones are able to pass into the groove. As soon as the tread leaves the surface of the road, the groove opens up again and the stone, being relatively small with respect to the normal groove opening, is readily thrown out. Thus, the undercut or recess on the groove sidewall makes possible highly efficient stone ejection, even when the tire is new.

It will be noted that in the various forms of the invention shown in the drawing, the undercut portion of the groove wall begins at a point that is spaced substantially closer to the tread surface than the outermost point of the projection on the opposite groove wall. This disposition of the undercut portion relative to the projection makes possible the desired constriction of the groove opening under load, as previously described. By this arrangement, as the groove walls come together under load, the outermost portion of the projection on one groove wall fits into the recess or undercut in the other groove wall, permitting the groove to narrow down. In other words, the undercut portion provides a clearance for the projection, so that the projection cannot act to keep the groove from constricting. This effect is found to be achieved in practice most advantageously when the undercut portion extends from a point spaced from the surface of the tread by not more than approximately ¼ of the total depth of the groove, while the outermost point of the projection is spaced from the tread surface by a distance approximately equal to from ½ to ¾ of the depth of the groove, as indicated previously. In this way, the projection is prevented from interference with the desired narrowing or constricting of the groove under load.

As the tread wears down in use, the projection on the other sidewall of the groove functions with increasing effectiveness to prevent any but the smallest stones from entering the grooves, which small stones are quickly ejected. The invention thereby provides for effective stone ejection on tires, both when the tire is new and when the tire is worn.

The form of the invention shown in Figs. 1 and 2, having the upper walls of the grooves flared outwardly at the tread surface, provides a desirable relatively wide appearance to the groove at the tread surface, without impairing the resistance of the tread to stone-retention.

Because of the manner in which the grooves are shaped, no difficulty is experienced in removing the tire from the mold in which it is shaped and vulcanized.

The relative enlargement of the bottom of the grooves provides a wide groove base that is not readily susceptible to cracking.

Having thus described our invention, what we claim and desire to protect by Letters Patent is:

1. In a pneumatic tire, a rubber tread having anti-skid grooves, one sidewall of each such groove having a laterally extending projection spaced from the surface of the tread by a distance equal to from ½ to ¾ of the depth of such groove, and the other side of such groove having a recess disposed opposite to said projection, said recess beginning at a point spaced substantially closer to the tread surface than the outermost point of said projection, whereby the said projection extends into the said recess when the groove is constricted under load.

2. In a pneumatic tire, a rubber tread having circumferentially extending anti-skid grooves, one sidewall of each such groove having a laterally extending projection in the lower portion of the groove, and the other sidewall of the groove being undercut, the said undercut portion beginning at a point spaced substantially closer to the tread surface than the outermost portion of the said projection, whereby the said undercut portion accommodates the said projection when the groove is narrowed under load.

3. In a pneumatic tire, a rubber tread having circumferentially extending anti-skid grooves, one sidewall of each such groove being gradually inclined inwardly from the tops of the groove toward the lower portions thereof, forming a laterally extending projection spaced from the surface of the tread by a distance equal to from $\frac{1}{2}$ to $\frac{3}{4}$ of the depth of such groove, and the other sidewall being undercut outwardly of the groove, to weaken the said other sidewall whereby it is deflected inwardly of the groove under load, and the said undercut portion starting at a point spaced from the tread surface by not more than $\frac{1}{4}$ of the depth of the groove, whereby the said undercut portion accommodates the said projection when the said other sidewall is deflected inwardly of the groove under load, and such undercut portion extending to the bottom of the groove.

4. In a pneumatic tire, a rubber tread having a circumferentially extending anti-skid groove, one sidewall of such groove having a laterally extending projection spaced from the surface of the tread by a distance equal to from $\frac{1}{2}$ to $\frac{3}{4}$ of the depth of the groove and such groove being laterally deflected over the zone of its medial depth, such lateral deflection being provided by a recess in the sidewall of the groove disposed opposite said projection, the said recess beginning at a point spaced substantially closer to the tread surface than the said projection, whereby the said recess accommodates said projection when the groove is narrowed under load.

5. In a pneumatic tire, a rubber tread having an anti-skid groove, one sidewall of such groove being gradually inclined inwardly from the surface of the tread to a point spaced from the said surface by a distance equal to from $\frac{1}{2}$ to $\frac{3}{4}$ of the depth of the groove, and said sidewall returning outwardly below said point to provide an enlargement of the groove at the base portion thereof, the opposite sidewall of such groove also being gradually inclined inwardly from the surface of the tread to a point spaced from the said surface by a distance equal to approximately $\frac{1}{4}$ of the depth of the groove, and said sidewall being undercut below said last mentioned point, said undercut portion extending to the bottom of the groove.

6. In a pneumatic tire a rubber tread having circumferentially extending grooves located on each side of the center line of the tread, said grooves having undercut portions, said undercut portions being located on the sides of the grooves toward the lateral edges of the tread, and projections on the sides of the grooves opposite to said undercut portions, said undercut portions beginning at a point spaced from the tread surface by not more than $\frac{1}{4}$ of the depth of the grooves, and the outermost portion of said projections being located at a point spaced from the tread surface by a distance equal to from $\frac{1}{2}$ to $\frac{3}{4}$ of the depth of the grooves.

7. In a pneumatic tire, a rubber tread having continuous circumferentially extending grooves located on each side of the center line of the tread, the sidewalls of such grooves toward the center line having a continuous laterally extending projection spaced from the surface of the tread by a distance equal to from $\frac{1}{2}$ to $\frac{3}{4}$ of the depth of the grooves, said projection being spaced from the bottom of the grooves, and the sidewalls of such grooves toward the lateral edges of the tread being undercut starting at a point spaced from the tread surface by a distance of not more than $\frac{1}{4}$ of the depth of the grooves.

WILLIAM F. R. BRISCOE.
VERNE H. BERRY.

References Cited in the file of this patent

UNITED STATES PATENTS

| Number | Name | Date |
| --- | --- | --- |
| 2,121,871 | Havens | June 28, 1938 |

FOREIGN PATENTS

| Number | Country | Date |
| --- | --- | --- |
| 459,835 | Great Britain | Jan. 15, 1937 |